Oct. 4, 1938.     A. H. SNYDER     2,132,224
VENT PLUG
Filed Jan. 8, 1937
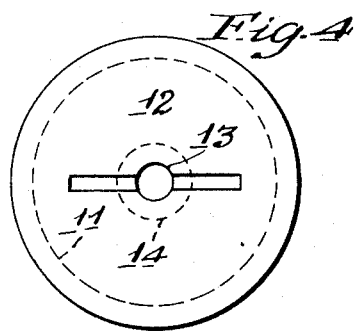
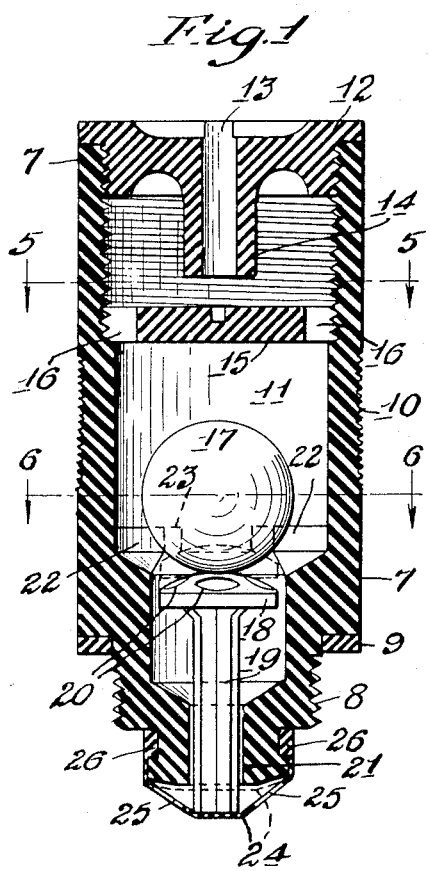
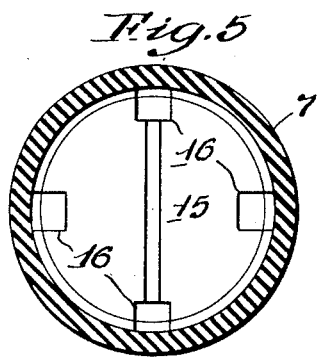
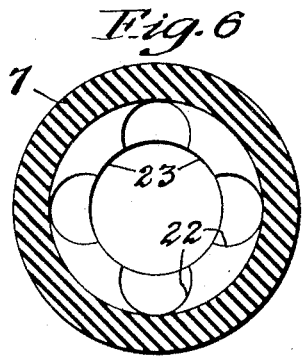
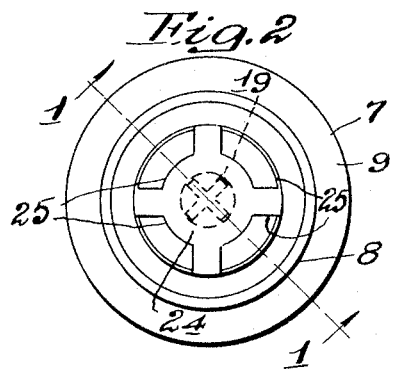
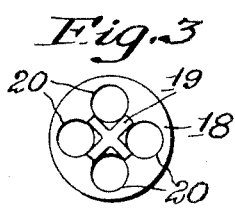
Inventor
Almond H. Snyder
By Stryker & Stryker
Attorneys Patented Oct. 4, 1938

2,132,224

UNITED STATES PATENT OFFICE 2,132,224

VENT PLUG

Almond H. Snyder, Lancaster, N. Y., assignor to National Battery Company, St. Paul, Minn., a corporation of Delaware Application January 8, 1937, Serial No. 119,576

1 Claim. (Cl. 251—147)

This invention relates to vent plugs, particularly although not exclusively, adapted for the storage batteries of aircraft or for other service where liquid containers must be vented and are likely to be inverted or tilted through a large angle of departure from the normal, upright position.

It is my object to provide a novel and more reliable vent plug for containers of such liquids as evolve gas and for use where it is important to guard against the escape of the liquid when the container is inverted or tilted beyond a predetermined angle.

A further object is to provide a vent plug of this class with a valve and operating mechanism so constructed and located that certainty of operation is promoted, tests and inspections to discover defects or failure to operate properly are facilitated and replacement of the valve is also facilitated.

The invention will be best understood by reference to the accompanying drawing in which:

Figure 1 is a central vertical section through my improved vent plug, taken partially on the line 1—1 of Fig. 2;

Fig. 2 is a bottom view of the plug;

Fig. 3 is a bottom view of the valve actuating stem and head;

Fig. 4 is a plan view of the plug; and

Figs. 5 and 6 are sections taken on the lines 5—5 and 6—6 respectively of Fig. 1, the ball weight having been removed to show parts otherwise concealed in Fig. 6.

The plug has a main body portion 7 of generally cylindrical form, constructed from acid-resistant insulating material, such as hard rubber. A threaded portion 8 near the normally lower end of the body 7 is provided to fit the usual or suitable opening in the cover of a battery or other container, a washer 9 being provided to seal the connection. A central portion 10 of the body 7 has a knurled or otherwise roughened surface to facilitate manipulation. Within the body of the plug is a trap chamber 11 closed at the top by a screw cover 12 which is bored axially to provide a small outlet opening 13. This opening communicates with the chamber 11 through a nipple 14. Beneath the nipple 14 and spaced slightly therefrom is a baffle disk 15 having slots 16 (Figs. 1 and 5) at suitable spaced intervals around its periphery. These slots allow the escape of gas to the outlet opening 13.

Within the chamber 11 is a weight 17, preferably of spherical form, to hold the valve in open position when the vent is in its normal or substantially upright position. The weight 17 normally rests on a head 18 formed on a valve stem 19 and on a slotted seat 23 formed in the body 7, as hereinafter more fully described. As shown in Fig. 3, the stem 19 is fluted longitudinally so that its horizontal section is substantially cross-shaped and the head 18 is drilled from top to bottom to provide passages 20. The stem 19 is slidable in an inlet passage 21 extending up from the lower end of the vent body 7 and the head 18 is movable in an enlargement of this passage communicating with the chamber 11. The ball weight 17 is prevented from closing the passage to the chamber 11 by the formation of slots 22 in a seat 23 for the ball 17, these slots being formed by drilling the seat 23 at suitable intervals, as shown in Fig. 6.

The lower end of the stem 19 rests on a flexible and elastic valve comprising a diaphragm 24 adapted to close the passage 21 when the weight 17 is removed from the head 18. The diaphragm 24 is preferably constructed from thin, soft rubber or other elastic and acid-resistant material. As shown in Figs. 1 and 2, it has a series of slots 25 cut through it and spaced from the axis of the plug to afford passages for gas when the valve is open, the central portion of the diaphragm being imperforate to close the passage 21 when freed of the weight 17. To secure the diaphragm 24 on the lower end of the vent body, I provide a thick rim 26 which is sufficiently elastic to snap into an annular groove formed near the lower end of the body 10, as indicated in Fig. 1.

In use, the gas evolved from the electrolyte or from other liquid in the container to which my device is attached escapes freely through the slots 25, passages 21 and 20 and slots 22 into the chamber 11 and thence escapes through the slots 16 and outlet 13. The design of the several passages is such that any condensate, which forms from the gases or vapor within the plug, flows back into the battery or other container. The valve 24 remains open for this normal operation as long as the container and plug are retained in the normal, upright position or within a predetermined angle of departure therefrom, such that the weight 17 remains on the head 18 of the valve stem.

The weight 17 is so proportioned relative to the diameter of the seat 23 that the valve is held open until the device is tilted to such angle as to create danger of the escape of the electrolyte through the vent plug. When this point is reached, the weight 17 rolls off its seat 23 and releases the valve stem 18, whereupon, due to the elasticity of the diaphragm 24, the latter moves to the dotted line position indicated in Fig. 1 to close the passage 21 and prevent the escape of the electrolyte or other liquid from the container. Because of my arrangement of the baffle disk 15 and nipple 14, the condensate which forms in the plug cannot escape through the vent openings 13 even when the device is inverted.

My device is positive in its action and effectively prevents the escape of the electrolyte even when used on the batteries of aircraft which are operated in inverted position and tilted to such angles as to allow the escape of the electrolyte in the absence of efficient valves in the vent plugs. Further advantages are secured by the location of the valve diaphragm on the exterior of the plug where it can be readily inspected, tested and replaced when necessary. Another feature of my device is the construction which insures free escape of the gases even in the event of failure of the valve diaphragm. The chamber for the head 18 is so designed as to maintain the passages 20 at all times in communication with the passages around the stem 19 and the seat for the ball weight 17 is so constructed as to prevent closure of the passages at this point.

Having described my invention, what I claim as new and desire to protect by Letters Patent is:

A vent plug comprising, a hollow cylindrical body having axially disposed inlet and outlet passages communicating with its lower and upper ends respectively and formed at its normally lower end with a reduced, tubular extension adapted to project through an opening in the cover of a battery or other container to be vented, a valve comprising a thin, elastic diaphragm capping the lower end of said tubular extension to close said inlet passage, said valve having apertures therethrough, offset from the axis of said body, a stem for actuating said valve movable in said inlet passage and formed with a head on its normally upper end to prevent removal of said stem downwardly through said inlet passage and a weight movable in said body and normally resting on said head for operating said stem to extend said valve to open position, said weight being arranged to release said stem and permit the closing of said valve upon the tilting of said body through a predetermined angle of departure from the vertical.

ALMOND H. SNYDER.